(12) United States Patent
Kornilovich

(10) Patent No.: US 8,521,023 B2
(45) Date of Patent: Aug. 27, 2013

(54) HIERARCHICAL PASSIVE NETWORKS

(75) Inventor: Pavel Kornilovich, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 508 days.

(21) Appl. No.: 12/991,665

(22) PCT Filed: May 8, 2008

(86) PCT No.: PCT/US2008/063118
§ 371 (c)(1),
(2), (4) Date: Nov. 8, 2010

(87) PCT Pub. No.: WO2009/136934
PCT Pub. Date: Nov. 12, 2009

(65) Prior Publication Data
US 2011/0097084 A1 Apr. 28, 2011

(51) Int. Cl.
*H04B 10/20* (2011.01)
(52) U.S. Cl.
USPC ............... 398/58; 398/66; 398/67; 398/60; 398/164; 398/135; 398/139; 398/141; 370/255; 370/256; 370/400; 370/389; 385/14; 385/15; 385/31
(58) Field of Classification Search
USPC ............... 398/58, 66, 59, 60, 67, 72, 73, 79, 398/135, 138, 139, 141, 164, 168; 370/255, 370/256, 400, 389, 392, 351, 230, 236, 338; 385/14, 15, 31, 24, 88, 89, 90, 92, 93
See application file for complete search history.

(56) References Cited

U.S. PATENT DOCUMENTS

| | | | |
|---|---|---|---|
| 5,790,288 A | | 8/1998 | Jager et al. |
| 5,818,984 A | * | 10/1998 | Ahmad et al. ................ 385/14 |
| 7,519,245 B2 | * | 4/2009 | Bresniker et al. ............ 385/14 |
| 2003/0167919 A1 | | 9/2003 | Schempf |
| 2004/0111753 A1 | | 6/2004 | Hoang |
| 2005/0265672 A1 | | 12/2005 | Theuerkorn et al. |
| 2007/0223400 A1 | | 9/2007 | Laarhuis et al. |

FOREIGN PATENT DOCUMENTS

| | | |
|---|---|---|
| JP | 1996-242208 | 9/1996 |
| JP | 1998-032545 | 2/1998 |
| JP | 2006-215816 | 8/2006 |

OTHER PUBLICATIONS

International search report, dated Jan. 16, 2009; PCT application No. PCT/US2008/063118, filed May 8, 2008.

* cited by examiner

*Primary Examiner* — Hanh Phan

(57) ABSTRACT

A communication network is described in which a number of computing nodes are situated in a logical multidimensional array and are linked by communication cables. The communication cables carry conduits connecting each node with all other nodes in the array so that a direct physical connection exists between every pair of computing nodes in the array. A method of providing interconnection among nodes in a communication network comprises arranging and connecting computing nodes in an array as described above, where each node passively redirects conduits to columns and rows in the array.

15 Claims, 4 Drawing Sheets

HIERARCHICAL PASSIVE NETWORKS

BACKGROUND

Computing systems, including servers, local networks, or regional and global networks, often require the interconnection of a number of computing units. For example, some electronic systems, such as servers, include a number of printed circuit boards placed into a blade server or rack server. The boards are typically equipped with connectors that allow them to attach to corresponding connectors on a backplane. Electrical interconnection among the boards is thereby provided by the backplane, allowing the exchange of information between the boards.

This approach has its limitations, however. With increasing data bandwidths required between servers, blades, or cards, backplanes capable of accommodating them become not only more expensive, but more complex and therefore less robust and reliable. Other such complex platforms include multi-core computers, computer clusters, and supercomputers. Each of these applications requires fast, high-bandwidth interconnections between computing units (processor cores, processors, or processor platforms) that also allows for input/output architecture capable of supporting high-speed computing. Such arrangements can involve thousands of individual computing nodes.

Directing data among such large networks can involve a tremendous number of time- and resource-consuming routing steps. For example, packet switching can involve queuing-related delays. On the other hand, optical interconnects provide the potential for very high bandwidths while providing generally less electromagnetic interference generation and susceptibility than electrical interconnects. However, optical communication between units generally involves converting data from electrical signal to a light signal and back. To minimize the limitations of routing and data conversion while maintaining a high degree of interconnection, it is desirable to directly connect as many units in a network to as many other units as possible. Unfortunately, for larger networks this can require large numbers of optical cables, adding to costs and making the system difficult to maintain.

DETAILED DESCRIPTION OF EXAMPLE EMBODIMENTS

In describing embodiments of the present invention, the following terminology will be used.

The singular forms "a," "an," and "the" include plural referents unless the context clearly dictates otherwise. Thus, for example, reference to "a component surface" includes reference to one or more of such surfaces.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Reference will now be made to the exemplary embodiments illustrated, and specific language will be used herein to describe the same. It will nevertheless be understood that no limitation of the scope of the invention is thereby intended.

It may be desirable to connect a number of computing nodes so that a direct physical connection exists between every pair of nodes. As used herein, the terms "nodes," "computing nodes," or simply "units" interchangeably refer to a processing unit that can be connected to and work with other such units, including circuit boards such as blades in a blade server, and computers such as servers and/or clients. One approach to providing such interconnections is to link all of the units in a linear arrangement, using communication cables carrying a plurality of communication conduits. In the case of a system using optical interconnects, the conduits may be fiber optics within a bundled cable or a ribbon cable, or other optical waveguide structures. In a more general sense, the terms "conduits" or can refer to any structure by which a data signal can travel from point to point in a system configured to accommodate that signal, including optical fibers, electrical wires, twisted pair cables, coaxial cables, and mechanical channels. A still more general term, "paths," includes not only conduits but other ways in which a signal may be transmitted from point to point, such as in free space optics systems. While the following description refers to connection by conduits in particular, it will be understood that variations of the present invention can be conceived in which other paths are used.

Figure 1:
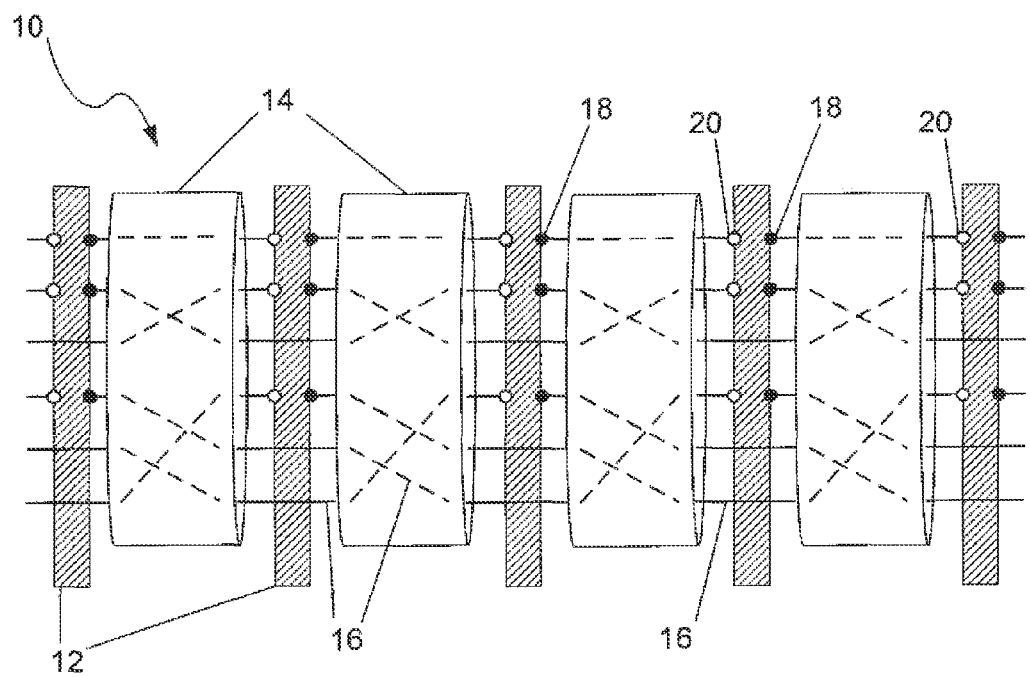
FIG. 1 is an illustration of a linear chain network of nodes providing pairwise connection among all nodes.

FIG. 1 provides an illustration of such an arrangement, where a daisy-chain network 10 having N number of nodes 12 can use N communication cables 14 to connect the nodes into a logical ring, wherein each cable includes conduits 16 by which each node is connected to every other node in the ring. In this ring, connectivity (and therefore information) passes from left to right, and from output ports 18 of each node to input ports 20 on a node downstream. In order to achieve full pairwise connectivity among all nodes, each node must originate N−1 connections. In this arrangement, each cable linking an upstream node to a downstream node carries one conduit connecting those two nodes, as well as N−2 fibers connecting the upstream node to other nodes, and (N−2)*(N−1)/2 pass-through fibers by which other nodes in the ring are connected with each other. Each communication cable carries a total of at least N*(N−1)/2 conduits.

This daisy-chain arrangement provides direct pairwise connections among all nodes, without resorting to packet switching or (in the case of optical fiber communication) electro-optical conversions at points other than the origin and termination of signals. However, the number of conduits per cable increases quadratically as the number of nodes increases. For example, a network in which N=1000 requires as many as ~500,000 conduits in each cable. Even with optical fibers as conduits, cables carrying so many fibers may be difficult to fabricate and maintain.

The present system and method can arrange the computers in a hierarchical network so that large networks are achievable without the same growth in fiber numbers. One outcome of the present system is to slow the growth in the number of conduits per cable that accompanies growth in network size. This is achieved while still providing direct connections between N computers/units without the need to resort to packet switching or mid-stream optical-to-electrical conversions. As such, packet switching and extra conversion steps become optional tools in building networks using the present system. Both schemes can therefore be omitted to reduce resource and maintenance requirements, or either one can be employed with networks of the present invention to further increase flexibility and bandwidth capability.

Figure 2:
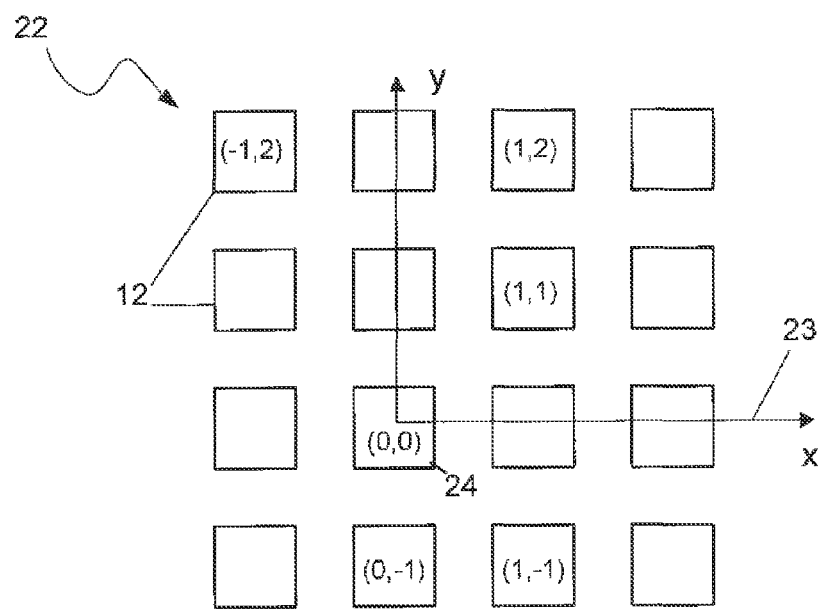
FIG. 2 illustrates a two-dimensional array of computing nodes in accordance with an embodiment.

In accordance with the present system, instead of a linear logical chain, nodes are arranged in a multi-dimensional logical array having a hierarchy of dimensions. FIG. 2 provides an illustration of a two-dimensional array 22 of computing nodes 12 in accordance with an embodiment of the invention. For convenience of description, each node may be labeled using an x,y coordinate system 23 where a node of interest 24 is designated (0,0). It should be noted, however, that such a system of designation nor indeed any system is required for the operation of the system. Each individual node distinguishes other nodes by the lattice shift vector that connects them, e.g. as the (1,1) neighbor, (−1,0) neighbor, etc. Periodic boundary conditions are assumed along both directions. For example, in the array shown in FIG. 2, the topmost neighbor for the node designated (1,2) is the (1,−1) node. It should be understood that the periodic boundary conditions are not necessary for the present system to function. Under periodic boundary conditions, all the nodes are in equivalent positions within the network, so that nodes having substantially identical connection architecture can be used. In the absence of periodic boundary conditions, all node locations are not equivalent; and therefore would require modifying the communication scheme. It should also be understood that, while arrays are discussed herein using common conventions for dimensional elements, e.g. "rows" and "columns," these are used for convenience of description rather than to limit the present invention to two-dimensional embodiments.

To provide direct pairwise connectivity among all node pairs, each node must be equipped to send (N−1) outputs and likewise receive (N−1) inputs. Each input or output is uniquely associated with a particular neighbor. Therefore the origin of a data signal can be determined by which input port the data signal arrives. Similarly, data can be sent to a particular node simply by activating the corresponding output port. A given node should possess method by which it identifies input and output ports (and therefore the nodes to/from which they travel). However, such a method may be as simple as the position in a connector in which a port is housed.

Figure 3:
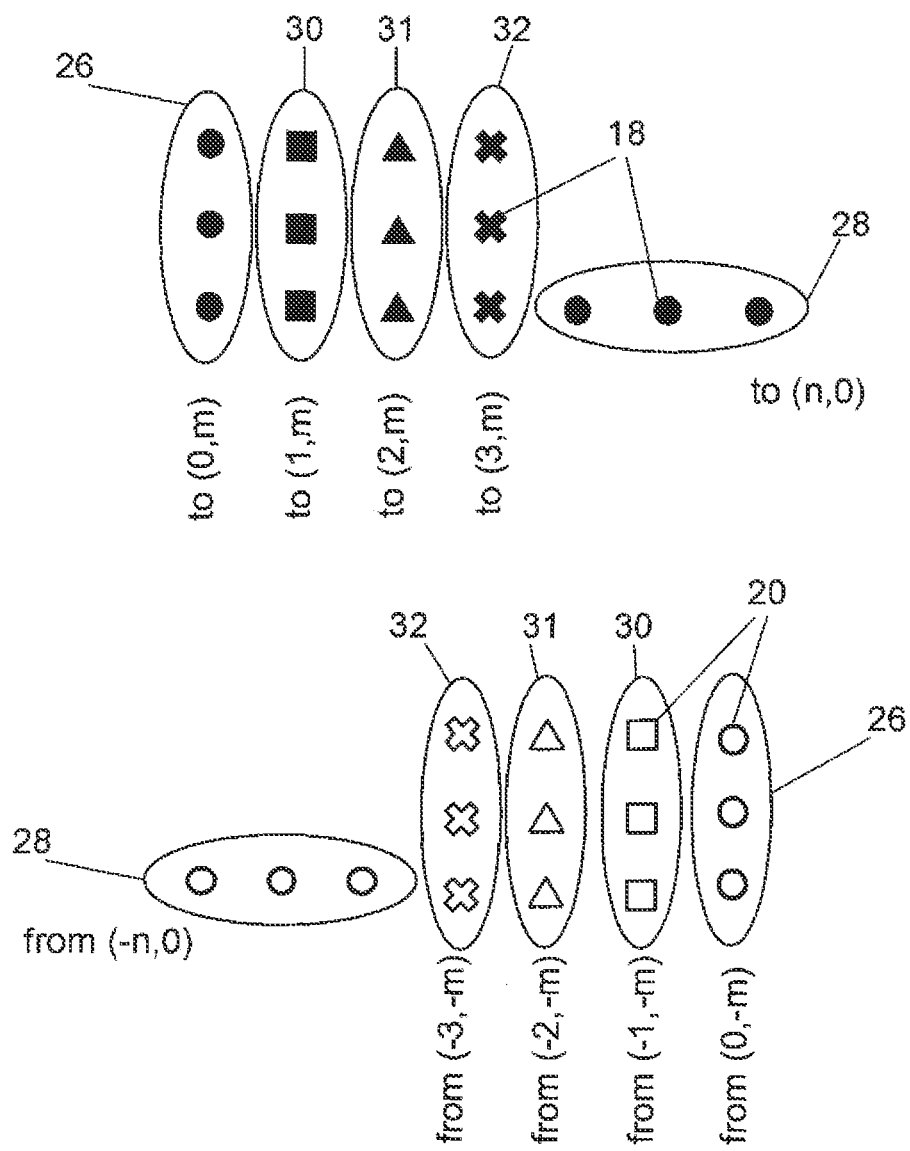
FIG. 3 is a diagram illustrating an arrangement of output ports and input ports in a 16-node two-dimensional network in accordance with an embodiment.

FIG. 3 shows a diagram illustrating the arrangement of output ports 18 and input ports 20 in a node according to an embodiment. In this arrangement, the ports are arranged into groups. For example, there are: a group 26 providing connections to other nodes in the same row; a group 28 providing connections to other nodes in the same column; and groups 30-32 for connections with nodes respectively situated one, two, and three columns removed from the current node.

The savings in the number of fibers or conduits in a cable is achieved by sending the signal through the array in a stepwise fashion. For example, one embodiment uses the convention in which each data signal is sent first along the row of nodes in which it originates until it reaches the column in which the destination node is located. Then, if necessary, the data signal is sent along the column to reach the destination node. It will be understood, however, that in an alternative embodiment the reverse convention (column first, then row) can serve equally well. Either of these conventions can be extended for arrays having more dimensions simply by adding redirection steps. Note that still no packet switching is needed to route the data signal to its destination. Rather, upon reaching the appropriate column of the lattice (the first step) the signal is passively redirected along the column and sent to the final destination (the second step). Due to the signal being sent in two or more steps, each along a different dimension of the array, such an arrangement of units becomes a hierarchical network in which the structure of the array itself provides the routing logic.

Figure 4:
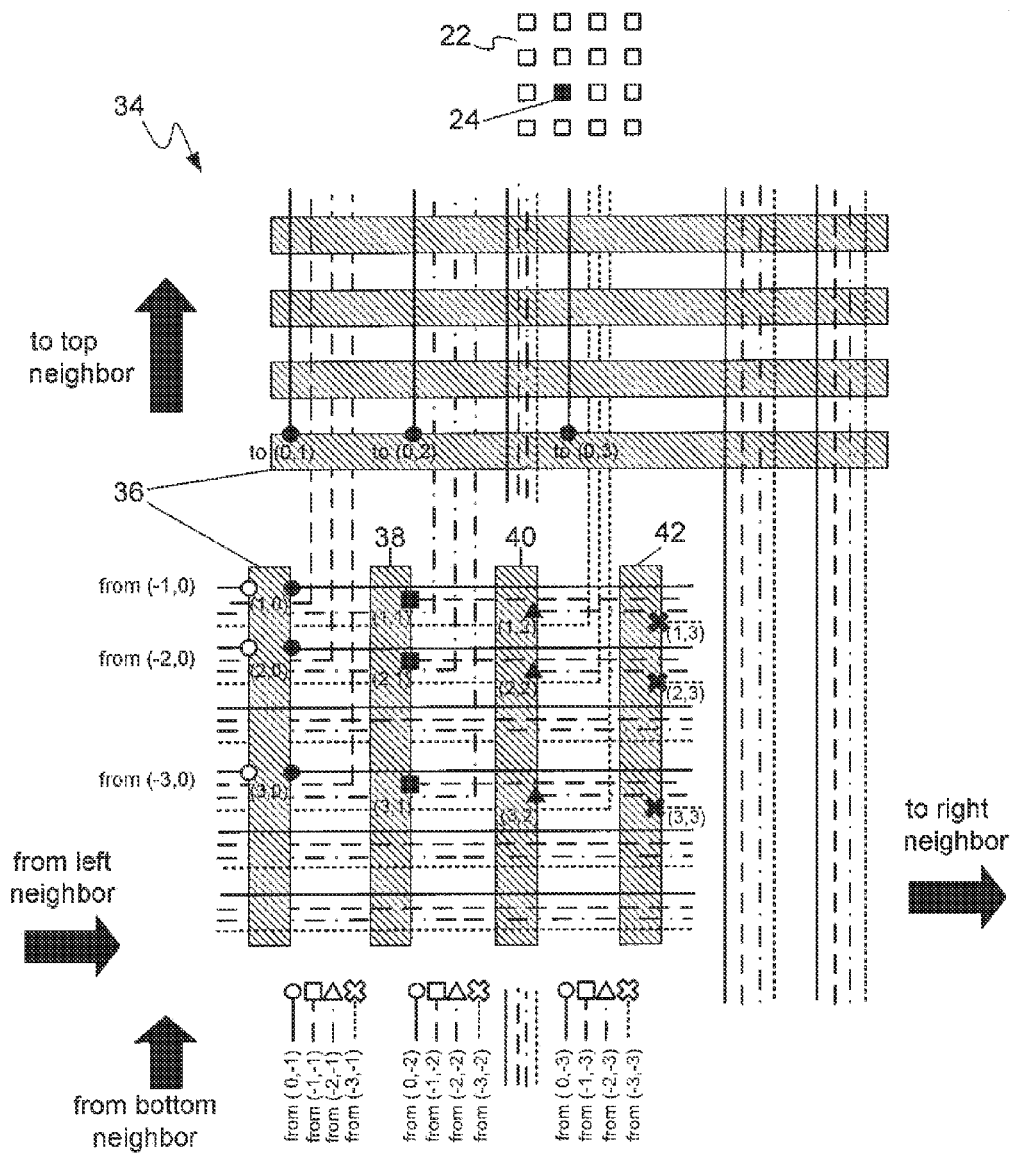
FIG. 4 is a diagram of a set of connectors, inputs, and outputs in a node designated (0,0) and used in an array such as that in FIG. 2.

FIG. 4 is a diagram of a set of passive connectors 34, inputs, outputs, and pass-throughs in a node of interest situated in an array 22 such as the N=16, two-dimensional network shown in FIG. 2. As will be explained below, the connectors can serve to organize incoming and outgoing conduits according to conduit groups that are each defined by the level of the array to which they are directed. The basic building block is the one-dimensional conduit group that provides the foundation of a linear network such as that shown in FIG. 1. This conduit group is indicated in FIG. 4 by solid lines and circles, and comprises conduits that link the nodes along a single row or column of the array. Since there are $\sqrt{N}=4$ nodes in every row and column of this quadratic array, this conduit group would comprise $\sqrt{N}*(\sqrt{N}-1)/2=6$ conduits. This conduit group 36 is linked to the node by output ports and input ports, shown in FIG. 3 by circles, and provide connections from the (0,0) node to every other node in the row or column in which that node is situated. Conduits in this group that serve to connect other pairs of nodes simply pass through this node. The ports are divided into d connectors, where d is the number of dimensions in the array. In the two-dimensional array shown, the ports are found in two connectors; one used to communicate with the neighbors (1,0), (2,0), (3,0) along the row, another with the neighbors (0,1), (0,2), (0,3) along the column.

To provide communication with nodes outside the row, the basic conduit group is duplicated $N^{(d-1)/d}$ times. In the two-dimensional array exemplified, the basic conduit group is duplicated $\sqrt{N}$ times in the two-dimensional array. However, unlike the one-dimensional conduit group 36, each of the additional conduit groups 38-42 connect all of the row neighbors of the (0,0) node to a row other than that in which the (0,0) node is situated.

In the embodiment shown in FIG. 4, a conduit group 38, comprising conduits from each of the row neighbors of (0,0) and intended for the neighbor (0,1), enters the node where they are redirected to the neighbor (0,1). Similarly, incoming conduits of conduit groups 40 and 42, also coming from the row neighbors of (0,0), are respectively aimed for the nodes two and three rows up from (0,0), i.e. (0,2) and (0,3). This illustrates the stepwise routing logic provided by the present invention. Signals from any given node are first sent downstream (from left to right in this embodiment) along their row until they reach the row neighbor in the appropriate column. If that row neighbor is the destination node, the signal terminates there (such as the one-dimensional conduit group 36). If the destination node lies in another row of that column, the row neighbor redirects the signal from its row-wise trajectory and sends it up the column the correct number of rows to reach the destination node.

Once again it should be emphasized that routing of data signals in the present invention is accomplished passively by redirecting the signal at the right column level. Packet switching is not needed. Redirection can be accomplished by a passive redirecting structure configured to change the trajectory or direction of a data signal or the conduit carrying it and send the signal or conduit in an appropriate direction. In one configuration, the redirecting structure is a bend or angle in the conduit itself. In other aspects, other structures can serve to redirect signals, including mirrors, lenses, and waveguides.

More specifically, each node sends the outgoing originating conduits of the conduit group 38 horizontal fibers out to the right neighbor, which are used by the (0,0) unit to send signals to the first top neighbor row, i.e. to the (1,1), (2,1) and (3,1) units. The corresponding output ports are shown in FIG. 4 by the three filled squares. On the receiving side, the incoming connections of the conduit group 38 fibers that arrive from the bottom neighbor, are used by the (0,0) unit to receive signals from the first left neighbor column, i.e. from the (−1,−1), (−1,−2) and (−1,−3) units. The corresponding input ports are shown in FIG. 4 by the three open squares. Analogously, conduit group 40 is used by (0,0) to send signals to the second top row, i.e. to the (1,2), (2,2) and (3,2) units, and to receive signals from the second neighbor column to the left, i.e. the (−2,−1), (−2,−2), and (−2,−3) units. The output ports and input ports for these connections are indicated in FIG. 4 by the filled and open triangles, respectively. In the same way, conduit group 42 is used by (0,0) to send signals to the third top row, i.e. to the (1,3), (2,3), and (3,3) nodes, and to receive signals from the third neighbor column to the left, i.e. (−3,−1), (−3,−2), and (−3,−3) nodes. The output ports and input ports for these connections are indicated in FIG. 4 by the filled and open crosses, respectively.

Once again it should be emphasized that routing of data signals in the present invention is accomplished passively by redirecting the signal at the right column level. Packet switching is not needed. Redirection can be accomplished by a passive redirecting structure configured to change the trajectory or direction of a data signal or the conduit carrying it and send the signal or conduit in an appropriate direction. In a particular aspect, the redirecting structure is a bend or angle in the conduit itself. In other aspects, other structures can serve to redirect signals, including mirrors, lenses, and waveguides.

Overall, each node can possess a connector running along the row, and another along the column. The number of fibers in each connector is (number of conduit groups)*(number of conduits in each conduit group)=$\sqrt{N}*[\sqrt{N}*(\sqrt{N}-1)]/2=N*(\sqrt{N}-1)/2$. The total number of fibers per unit is twice that=$N*(\sqrt{N}-1)$. For large N, this number scales as $\sim N^{3/2}$, rather than $\sim N^2/2$ as in the linear logical network described in FIG. 1. For example, for a network of $256=2^8$ units, the linear single-step network requires $2^{16}/2=32,768$ fibers per unit, while the two-dimensional two-step network requires only 4096 fibers per unit, a factor of 8 less.

The described concept can be generalized to higher dimensions. However, the complexity of the architecture prevents simple visualization of resulting connectors. Therefore, it will be described here verbally using the analogy with the just considered two-step hierarchical network. In a three-step network, the nodes are arranged in a three-dimensional logical array. The signal is first transferred along one axis 1, then along the second axis, and finally along the third axis of the array. The linear size of the array is $N^{1/3}$. The basic connector now has $N^{1/3}(N^{1/3}-1)/2$ fibers. The basic connector can be duplicated $N^{2/3}$ times, resulting in $N^{2/3}$ conduit groups. The conduit groups are used to send/receive signals to $N^{2/3}$ rows of nodes, said rows running parallel to axis 1. Each node must have 3 such composite connectors, one for each logical dimension. Thus the total number of conduits per node is $3*N^{2/3}*[N^{1/3}(N^{1/3}-1)/2]=3*N*(N^{1/3}-1)/2$. Generalizing to a d-step d-dimensional logical network, the total number of conduits per node is $$F_N(d)=(\tfrac{1}{2})*d*N*(N^{1/d}-1).$$

Figure 5:
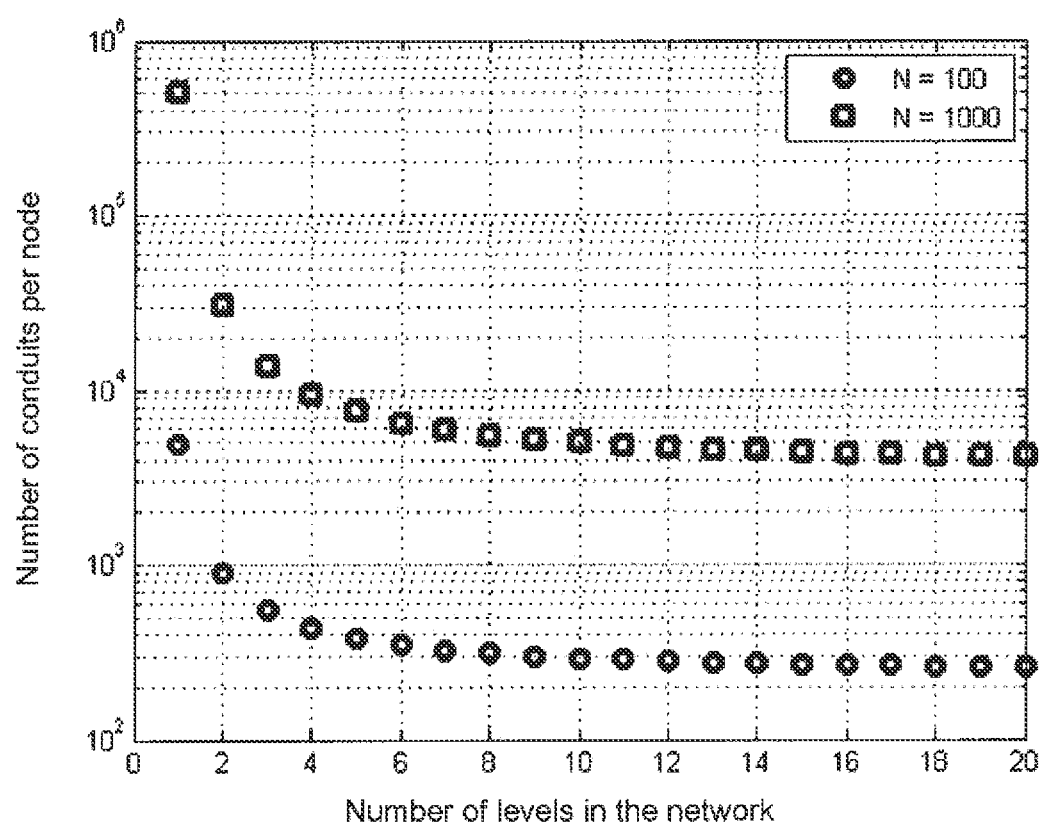
FIG. 5 is a plot of a function relating the number of conduits per unit to the number of hierarchical levels in networks according to the present embodiments.

This function monotonically decreases with d, as shown in FIG. 5. In the limit of very large d, one obtains:

$$\lim_{d\to\infty} F_N(d)=(\tfrac{1}{2})*d*N*[1+\ln(N)/d-1]=(\tfrac{1}{2})*N*\ln(N).$$

Thus the $(\tfrac{1}{2})*N^2$ scaling of the one-dimensional network improves to $(\tfrac{1}{2})*N*\ln(N)$ scaling of the infinite-dimensional network. For example, for N=1000, $F_{1000}(1)$=499,500 but $F_{1000}(\infty)$=3454, a factor of 145 less. For N=1,000,000, $F_{10^6}(1)\approx5*10^{11}$, while $F_{10^6}(\infty)\approx6.9*10^6$, a factor of 72,464 less.

Summarizing and reiterating to some extent, an hierarchical logical network provides direct pairwise communication between all nodes in the network. The nodes can include circuit boards, server elements, servers, and clients. Furthermore, the present system can be employed in building networks based on optical fiber transmission as well as electrical transmission networks using electrical wires or cables. In particular relative to the prior art, the connectivity of the present invention is exclusively passive, needing no packet switching or extensive optical-to-electrical conversion or vice-versa. In addition, the proposed architecture is uniform, i.e. all the units and connectors are identical and equivalent. Such a network is therefore easily extendable.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A communication network having a hierarchy of dimensions, comprising:
   a plurality of computing nodes, arranged in a logical array comprising a plurality of rows and columns;
   a plurality of communication cables linking each adjacent pair of nodes in each row and each column, wherein each communication cable comprises:
   i. a plurality of conduits, wherein each conduit has an upstream end and a downstream end;
   ii. a conduit group comprising conduits that each connect the computing node at the upstream end with other computing nodes in the row or column and pass-through conduits connecting other computing nodes in the row or column with each other; and
   iii. a plurality of vertical conduit groups, each comprising conduits connecting the computing nodes in a row to a computing node in a column, and wherein each computing node passively redirects conduits in vertical conduit groups to the appropriate computing node in a target column, so that a direct physical connection exists between every pair of computing nodes in the array.

2. The communication network of claim 1, wherein each computing node comprises a plurality of connectors, each connector including:
   a plurality of output ports connecting upstream ends to the computing node;
   a plurality of input ports connecting downstream ends to the computing node; and
   a plurality of pass-through ports conveying pass-through conduits through the computing node.

3. The communication network of claim 2, wherein the conduits are optical fibers, the input ports include photodetectors, the output ports include optical sources, and the pass-through ports include optical vias.

4. The communication network of claim 2, wherein the conduits are electrical wires, the input ports and the output ports include electrical connections.

5. The communication network of claim 2, wherein the conduits are twisted pair cables.

6. The communication network of claim 5, wherein the conduits are coaxial cables, and the input ports and output ports are modular plug pin connectors.

7. The communication network of claim 1, wherein each computing node comprises a passive redirecting structure.

8. The communication network of claim 7, wherein there are no more than $\frac{1}{2}*N*(N^{1/d}-1)$ conduits in each communication cable, and no more than $\frac{1}{2}*d*N*(N^{1/d}-1)$ conduits per computing node, where N is the number of computing nodes in the array and d is the number of dimensions in the array.

9. The communication network of claim 1, wherein all dimensions of the array are equal in size.

10. The communication network of claim 1, wherein the array has three dimensions, and there are no more than $N*(N^{1/3}-1)/2$ conduits per communication cable and no more than $3*N*(N^{1/3}-1)/2$ conduits per node.

11. An optical communication network, comprising:
    a plurality of computing nodes, arranged in a logical array comprising a plurality of rows and columns, and having a hierarchy of dimensions;
    a plurality of optical cables linking each adjacent pair of nodes in each row and each column, wherein each optical cable comprises:
    i. a plurality of optical fibers, wherein each optical fiber has an upstream end and a downstream end;
    ii. a fiber group comprising optical fibers that each connect the computing node at the upstream end with other computing nodes in the row or column and pass-through optical fibers connecting other computing nodes in the row or column with each other; and
    iii. a plurality of vertical fiber groups, each comprising optical fibers connecting the computing nodes in a row to a computing node in a column, and wherein each computing node passively redirects optical fibers in vertical fiber groups to the appropriate computing node in a target column, so that a direct physical connection exists between every pair of computing nodes in the array.

12. The optical communication network of claim 11, wherein each computing node comprises at least one optical redirection structure selected from the group consisting of:
    a bend in the optical fiber, a mirror, a waveguide, and a lens.

13. A method of providing interconnection among nodes in a communication network, comprising:
    arranging a plurality of computing nodes in a logical array comprising a plurality of rows and columns, and having a hierarchy of dimensions; and
    linking each adjacent pair of computing nodes using communication cables each having an upstream end and a downstream end and comprising a plurality of conduit groups including;
    i. a conduit group comprising conduits that each connect the computing node at its upstream end with other computing nodes in the row or column, and pass-through conduits connecting other computing nodes in the row or column with each other; and
    iii. a plurality of vertical conduit groups, each comprising conduits connecting the computing nodes in a row to a computing node in a column; and
    passively redirecting conduits in vertical conduit groups to an appropriate computing node in a target column.

14. The method of claim 13, comprising the additional step of moving data in the array in a stepwise fashion that alternates between rows and columns.

15. The method of claim 13, wherein the data is sent downstream along a row until the data reaches the target column, and then optionally the data is sent downstream along the target column.

* * * * *